United States Patent [19]

Capella

[11] Patent Number: 4,543,165

[45] Date of Patent: Sep. 24, 1985

[54] PRODUCT SEPARATION AND RECOVERY SYSTEM

[75] Inventor: Joseph A. Capella, Crystal River, Fla.

[73] Assignee: Recovery Technology, Inc., Gainesville, Fla.

[21] Appl. No.: 518,891

[22] Filed: Aug. 1, 1983

[51] Int. Cl.[4] .............................................. B01D 3/04
[52] U.S. Cl. ...................................... 203/89; 203/100; 202/170; 202/176; 202/180; 202/197; 202/200; 202/235; 202/236; 202/237; 159/28.6; 159/49
[58] Field of Search ............... 202/155, 153, 159, 235, 202/236, 237, 170, 200, 176, 197, 180; 203/14, 89, 100; 159/DIG. 28, 28.6, 49; 134/10, 11, 12; 261/114 R; 68/18 R

[56] References Cited

U.S. PATENT DOCUMENTS

| 297,603 | 4/1984 | Huston | 196/133 |
|---|---|---|---|
| 1,249,480 | 12/1917 | Pflugfelder | 202/236 |
| 1,723,748 | 8/1929 | Primrose | 208/359 |
| 2,199,320 | 4/1940 | Von Le Juge | 203/10 |
| 2,700,645 | 1/1955 | Kearney | 202/170 |
| 2,711,978 | 6/1955 | Groom | 134/10 |
| 2,910,137 | 3/1958 | Victor | 55/59 |
| 3,042,553 | 7/1962 | Kearney et al. | 134/11 |
| 3,070,463 | 12/1962 | Barday | 134/11 |
| 3,308,839 | 10/1964 | Barday | 134/76 |
| 3,610,260 | 10/1971 | Kearney | 134/12 |
| 4,009,230 | 2/1977 | Smorenburg | 202/173 |
| 4,098,005 | 7/1978 | Wiarda | 202/180 |

FOREIGN PATENT DOCUMENTS

| 0569039 | 5/1945 | United Kingdom | 261/114 R |
|---|---|---|---|
| 2035127 | 6/1980 | United Kingdom | 261/114 R |
| 262086 | 10/1968 | U.S.S.R. | 261/114 R |
| 0464316 | 10/1971 | U.S.S.R. | 261/114 R |

Primary Examiner—S. Leon Bashore
Assistant Examiner—Virginia Manoharan
Attorney, Agent, or Firm—Dowell & Dowell

[57] ABSTRACT

A closed cycle recovery system and apparatus for continuously recovering residual products which have been washed or flushed from tank trucks, tank cars, and other transportation or storage containers while simultaneously separating and recovering the water, solvent or other fluids which are used to wash or flush such tanks and containers in which a mixture of the water, solvent, and other fluids, and the residual product is separated by evaporation of the water, solvent, or other fluids by passing the mixture through a distillation chamber having a series of tube and flat plate heat exchange surfaces so that the individual fluids and product may be purified and separately stored for further use.

11 Claims, 6 Drawing Figures

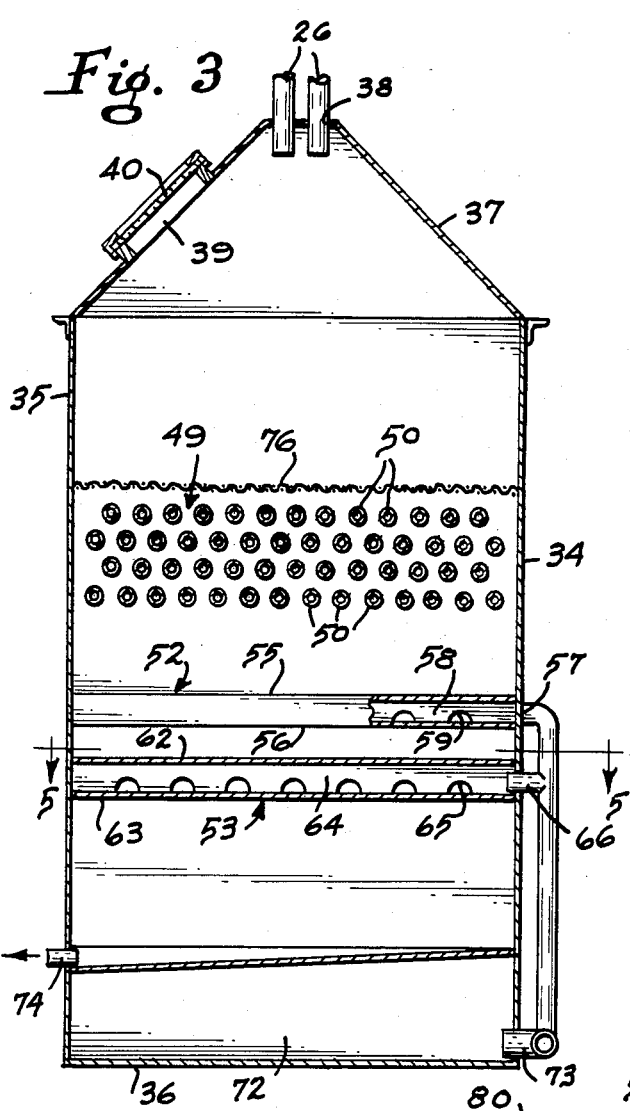
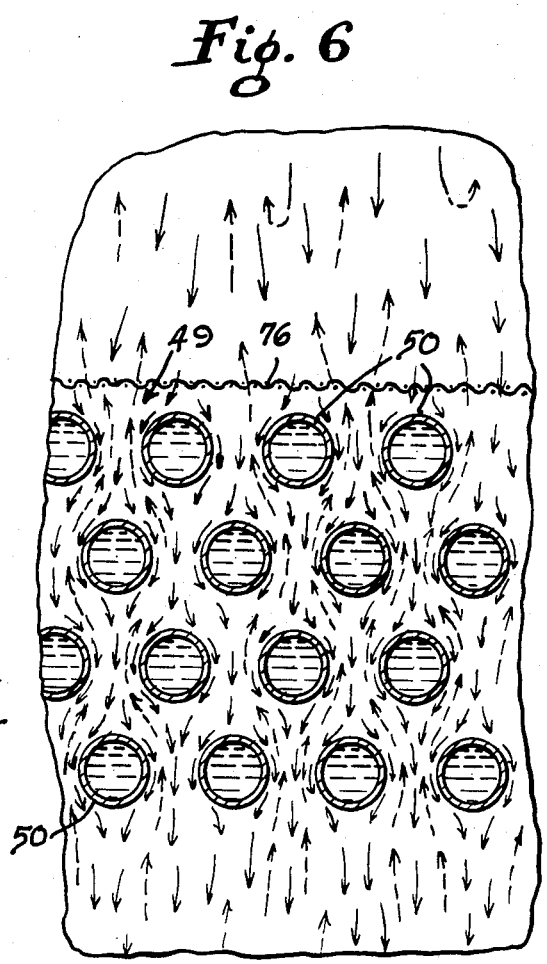
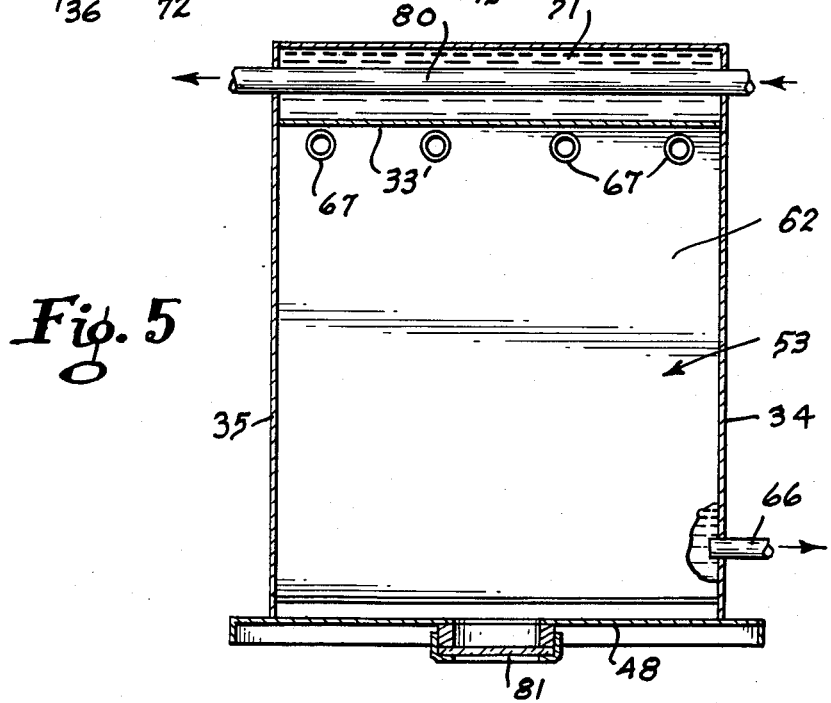

PRODUCT SEPARATION AND RECOVERY SYSTEM

BACKGROUND OF THE INVENTION

1. Field of the Invention

This invention is directed generally to a method and apparatus for recovering products such as oils and other chemical residues from tanks or containers used to transport or store such products and particularly to a method and apparatus which provides for the continuous recycling of various solvents or fluids which are used to clean or flush the tanks or containers by separating and purifying the solvents and residual products from a mixture of the same which is passed through a tube and flat plate heat exchanger wherein the solvents are evaporated in a substantially continuous process.

2. History of the Prior Art

It is the general practice in the cleaning of tanks and containers used for the storage and transportation of chemical products including oils, resins, epoxys, paints, and waste chemicals to use water or steam, together with the possible addition of a suitable wetting agent, to spray and flush the interior walls of the container or tank and thereafter collect the mixture of residual product and cleaning fluid. This practice results in a large volume of contaminated waste which must be suitably disposed of in such a manner as to insure no adverse effect upon the ecology. The disposal of contaminated waste has become increasingly more undesirable not only because of increased disposal costs, but because the products being cleaned from the tanks or containers as well as the cleaning solvents are themselves valuable commodities.

In addition to the foregoing, when water is used to clean a tank or container, it is the mechanical action of the fluid impacting against the walls of the tank or container which functions to drive the remaining products from the walls of such tanks and containers. Thus, a large amount of water must be used in a continuous stream to physically separate or force the product from the tank. The larger the quantity of cleaning fluids, the greater the waste disposal problem. By way of example, it takes approximately seven gallons of fluid to wet the walls of a 5,000 gallon tank, however, it may take 400 or more gallons of water to flush a product from the tank walls (with the exact amount depending, of course, upon the type of product being removed, the use of wetting agents, or the addition of heat in the form of steam).

It has been determined that the cleaning of transportation and storage tanks and containers may be more easily and thoroughly accomplished utilizing chemical solvents. These solvents make the residual products within the tanks or containers more soluble and thus have the beneficial effect of reducing the amount of effluent waste which must be handled or disposed of.

The problems which have been encountered with the use of solvent cleaning systems involve the costs and expenses incurred in using the solvents. Once the solvent has been contaminated during a cleaning cycle, it is of no value for further cleaning operations as it now carries a portion of a contaminant with it. Thus, either additional solvent must be used, which increases costs for cleaning fluid supplies, or the used solvent must be purified and collected for reuse. Collecting the solvent presents additional problems in that the type of solvent and its ability to be reclaimed will vary from one solvent to another. It would be preferred to have a cleaning system which is capable of cleaning as many types of chemical products from a tank as is possible, and thus the use of diverse types of solvents would be likely.

Generally, various batch type distillation devices are being used to separate solvents from other products. These batch vaporizors, however, are not totally efficient and do not provide for a continuous flow of contaminated waste or liquid therethrough. In addition, other types of continuous flat plate heat exchangers have been used to separate solvent from other liquids again, however, it is not believed that such distillation equipment permits sufficient utility to provide for the continuous vaporization of a plurality of fluids from a residual product so as to permit each of the fluids to be substantially purified and collected for reuse.

SUMMARY OF THE INVENTION

A method and apparatus for recovering residual products from transportation and storage tanks or containers by separating such products from a solvent or other cleansing fluid, which may include water, which is used to flush the residual products from the interior of the tanks or containers by passing the mixture of solvent and product through a distillation chamber having a series of tube and flat plate heating exchange surfaces after such mixture has been preheated by passage through the heating medium within the distillation chamber whereby the solvents and any water will be evaporated. The apparatus also includes a separate batching chamber which may be selectively used to retain the product flowing through the chamber in order that any residual solvent or water may be evaporated therefrom prior to collecting and separately storing the product and any solvents and water.

It is the primary object of this invention to provide an apparatus for separating solvents, water or other fluids from a mixture of such fluids with a product such as an oil or other chemical which has been flushed from a transportation or storage container or tank so that the solvents may be continuously used in the cleaning process without contamination from chemicals mixed therewith during prior cleaning cycles.

It is another object of this invention to provide an apparatus wherein a mixture of solvent and a product are first preheated and thereafter sprayed on to a first surface which serves to dissipate and spread the fluid uniformally throughout the apparatus and which controls the rate of flow of the fluid as it passes through a series of tube and flat plate heat exchange surfaces wherein most of the solvent is evaporated and wherein the product may be selectively retained in a selectively adjustable batching chamber to drive off any remaining solvents prior to the product being collected and stored.

It is yet another object of this invention to provide a closed cycle recovery system for cleaning transportation and storage tanks wherein solvents, chemicals, water and other cleaning fluids may be separated and retained for subsequent use.

It is another object of this invention to provide a closed cycle recovery tank cleaning system wherein the products being cleaned from the tank are separated from the cleaning agent in such a manner that the product is recovered in a substantially pure state and that the cleaning medium is also recovered in a substantially pure state even though the cleaning medium may consist of several different chemicals or fluids.

BRIEF DESCRIPTION OF THE DRAWINGS

FIG. 3 is a cross-sectional view taken along lines 3—3 of FIG. 2.

FIG. 5 is a cross-sectional view taken along lines 5—5 of FIG. 3 having portions broken away.

FIG. 6 is an enlarged partial view of the screen and tubular heat exchangers shown in FIG. 3.

DESCRIPTION OF THE PREFERRED EMBODIMENT

Figure 1:
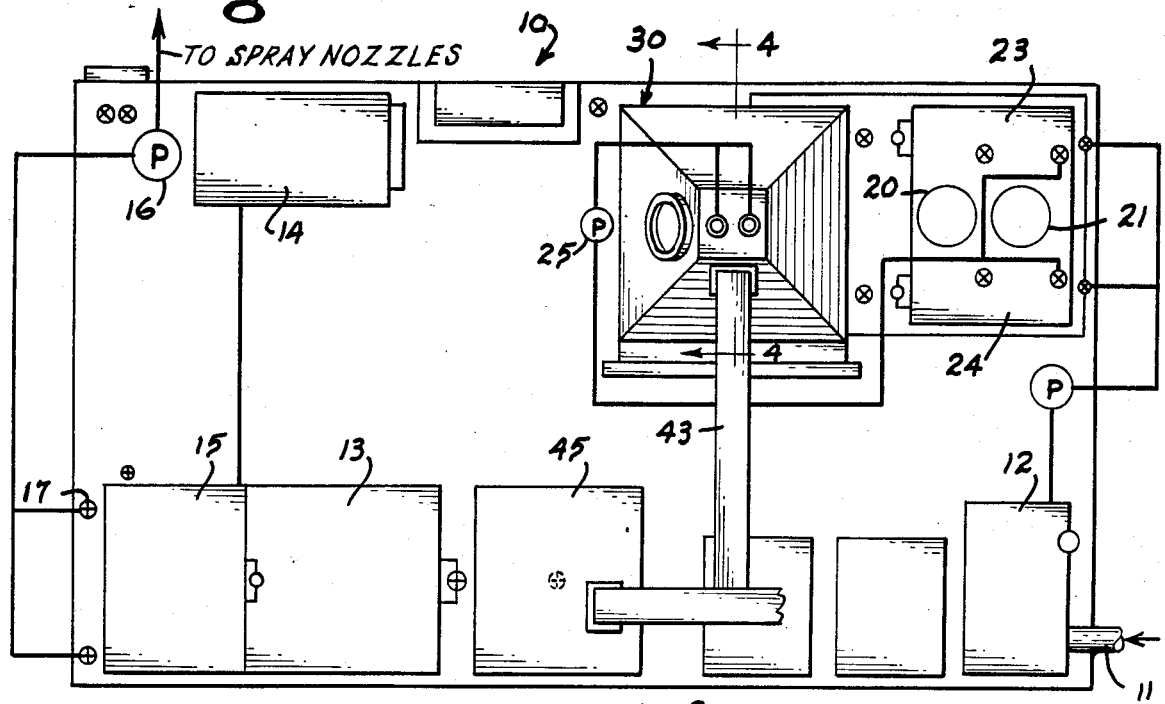
FIG. 1 is a partial top plan view of a portion of a closed cycle recovery tank cleaning system of the present invention.
Figure 2:
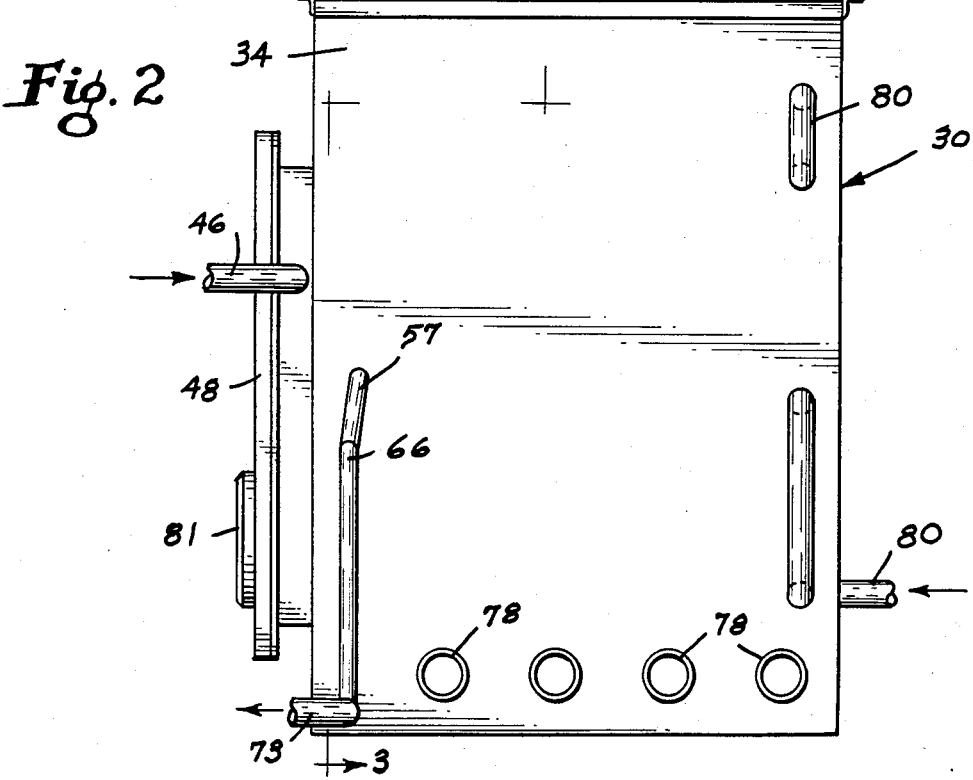
FIG. 2 is a left side elevational view of the distillation chamber of the present invention.

With continued reference to the drawings a portion of a closed cycle recovery tank or container cleaning system 10 is shown in FIG. 1. The purpose of the portion of the system as shown is to process and separate incoming mixtures of solvents, water, and any number of products which have been cleaned or flushed from a transportation or storage container.

When it is desired to clean the interior of a storage tank or container such as a tanker truck, the truck is located adjacent the recovery system 10 and one or more spray bars (not shown) are positioned within the tank. In order to receive the residual products from within the tank together with the flushing agent, the discharge valve from the tank is connected to the recovery tank system by way of an inlet 11 which directs the incoming contaminated mixture into a receiving tank 12.

With the system of the present invention it is possible to utilize one or more solvents which are individually stored in one or more solvent containers 13. To accelerate the cleaning process, the solvents may be introduced and heated with steam which is generated by steam generator 14 which is connected to a clean water storage tank 15. Steam from the steam generator may be mixed with the solvent as the solvent is drawn by the primary cleaning pump 16 through one or more valves 17 and directed toward the cleaning nozzles located within the tank or container being cleaned (not shown). As the solvents and water are drained with the residual product from within the container, they are received by the receiving tank 12.

As it is desired to separate the solvents from the water and residual chemical products which may include oils, resins, epoxys, paints, and other chemicals or chemical wastes, the closed cycle recovery system 10 provides means for separating and separately collecting each of the foregoing fluids in a purified state. The mixture of contaminated liquid in the receiver tank 12 is first filtered through a pair of filter elements 20 and 21 and thereafter retained in a pair of holding tanks 23 and 24. The filtered mixture stored within the holding tanks 23 and 24 is thereafter selectively drawn by the distillation feed pump 25 and introduced through one or more injector nozzles 26 into a distillation chamber 30. Prior to being conveyed into the distillation chamber 30, the mixture is preheated as will hereinafter be described in greater detail.

The distillation chamber includes a housing 31 having front and back walls 32 and 33 which are connected at either side by side walls 34 and 35. The housing is closed at the bottom by a bottom panel member 36 and at the top by a dome-like lid member 37. One or more openings 38 are provided in the uppermost portion of the lid 37 through which the injector nozzles 26 are located. Another opening 39 is provided through the lid and oriented towards the side wall 35 of the chamber. The opening 39 is sealed by a window 40 which permits visual inspection of the distillation chamber. Another large opening 41 is made through the lid 37 oriented toward the front wall 32 of the chamber. Opening 41 provides an outlet for vapor generated within the chamber which vapor is conducted by way of ducting 43 to one or more condenser units 45 in a manner as will be discussed in greater detail hereinafter.

Heat is provided within the distillation chamber by oil which is introduced by way of oil inlet line 46 into a liquid distribution header 47 which is located inside the chamber adjacent a door portion 48 which extends outwardly from the front wall 32 thereof. The oil within the distribution header 47 passes through a tubular heat exchanger 49 which consists of a plurality of rows of tubular heat exchange pipes 50 into a vertical heating chamber 51. The vertical heating chamber is defined between the rear wall 33 of the chamber 30 and an interior wall 33' which extends vertically and generally parallel to the rear wall 33 and between the side walls 34 and 35. At least two flat plate heat exchangers 52 and 53 are disposed below the tubular heat exchanger 49. The first or uppermost flat plate heat exchanger 52 is generally hollow and has an opening 54 along its length which communicates with the vertical heating chamber 51 so that oil within the vertical heating chamber is free to flow between the upper and lower surfaces 55 and 56 thereof outwardly through oil outlet line 57. The flow of oil through the flat plate heat exchanger may be retarded and distributed by means of a baffle plate 58 having a plurality of spaced semicircular openings 59 therein.

Figure 4:
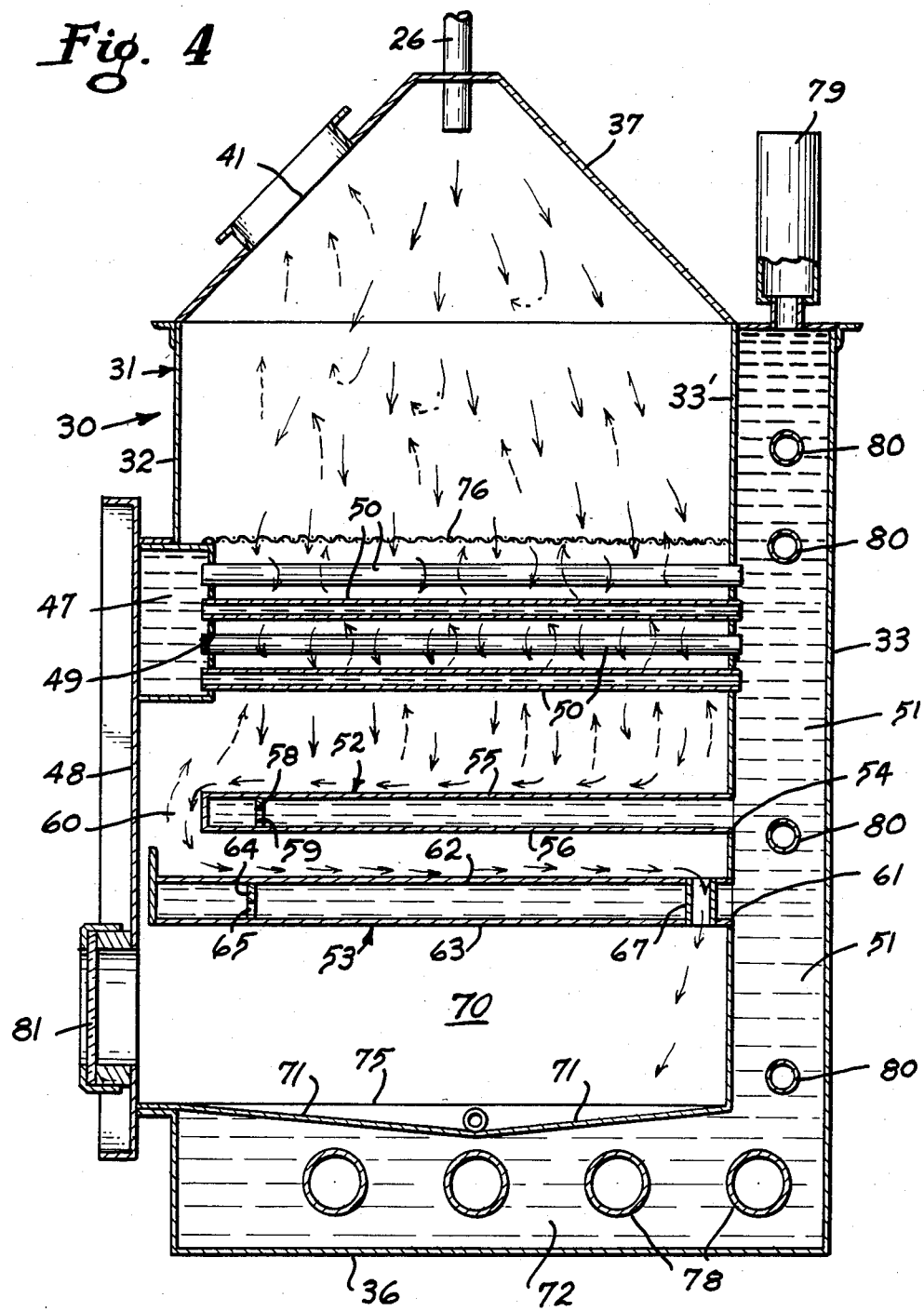
FIG. 4 is an enlarged cross-sectional view taken along lines 4—4 of FIG. 1.

With particular reference to FIG. 4 it should be noted that the upper flat plate heat exchanger extends from the inner wall 33' forwardly towards the front wall 32 of the chamber and terminates in spaced relationship thereto thereby providing a passageway 60 through which fluid is free to flow downwardly toward the second flat plate heat exchanger 53. The flat plate heat exchanger 53 is also hollow and communicates with the vertical heating chamber 51 by way of elongated opening 61 so that oil may flow between the upper and lower walls 62 and 63 thereof. Oil flowing within the heat exchanger 53 is retarded and distributed by a baffle plate 64 having a plurality of openings 65 therein, and oil passing therethrough is conducted out through oil outlet 66. A plurality of tubular members 67 are provided through the second heat exchanger adjacent the opening 61 whereby fluid flowing along the upper surface 62 thereof may pass into a collection or product outlet chamber 70.

Although not specifically shown in the drawings, the upper surfaces 55 and 62 of the flat plate heat exchangers 52 and 53, respectively, may have a plurality of weirs or other ridges placed or formed thereon. The weirs or ridges would be used to restrict the flow of fluid along the surface of the heat exchangers and also to make the flow more turbulent thereby further promoting vaporization of water and solvent from the mixture being separated.

The collection chamber 70 includes a tapered inner bottom heat exchange plate 71 which is spaced from the bottom wall 36 so as to provide a hollow chamber 72 in which oil flows from the vertical chamber outwardly through an oil outlet line 73. The heat exchange plate 71 provides an additional heat exchange surface and is designed to funnel liquid collected thereon towards a product collection pipe 74. In order to provide a means to further process or distill the product deposited on the plate 71 a weir 75 is provided and extends across the plate 71 so as to obstruct the flow of fluid passing to the product outlet pipe 74. As fluid is collected on the plate 71, such fluid will collect against the weir and thereby be retained in a pool until such time as the height of liquid retained by the weir is such as to cause the liquid to flow over the top thereof and outwardly through the collection pipe 74. By making the weir adjustable in height, the collection time may be increased or decreased depending upon the volatility of the products being vaporized.

With particular reference to FIGS. 3 and 6, as the contaminated fluid or mixture is sprayed through nozzles 26 into the distillation chamber, the mixture will first impact against a porous screen member 76 which extends across the full depth and width of the still at a location above the tubular heat exchanger 49. The screen is provided to insure that the incoming contaminated fluid does not pass quickly and directly through the tubular heat exchanger 49. The fine mesh screen decelerates the incoming liquid and causes the liquid to drip therefrom on to the heat exchange tubes 50 at a low velocity. The screen also functions to disperse the incoming liquid so that it is uniformly distributed across the surface thereof. As the liquid drips from the screen on to the surface of the tubular heat exchange elements 50 the drops will have a tendency to travel around the tube as a thin film thus permitting the solvent and water therein to be heated and vaporized. After the liquid passes through the series of tubular heat exchange members, it flows by gravity to the upper surface of the first flat plate heat exchanger 52. The first flat heat exchanger is sloped approximately ⅛ inch per foot towards the front of the distillation chamber thereby permitting the liquid thereon to travel slowly by gravity across the upper surface and down through the passage 60 to the upper surface of the second flat plate heat exchanger 53. The fluid continues to travel downwardly on a slope of approximately ½ inch per foot towards the tubular openings 67 which communicate the second flat plate heat exchanger with the lower heat exchange surface of the distillation chamber.

As shown in the drawings there are four rows of heat exchange tubes 50 which extend between the oil distribution header 47 and the vertical heating chamber. The number of rows of heat exchange tubes may, of course, be increased to provide for additional heat exchange surface area.

As previously discussed, heat is supplied to the distillation chamber by oil which is circulated by a pump, (not shown), which is connected between the oil inlet line 46 and the oil outlets 57, 66, and 73. The oil is heated by a plurality of emersion heaters 78 which are disposed in the hollow chamber 72 adjacent the lower portion of the distillation chamber as shown in FIG. 4. An expansion tank or valve 79 is also provided and is located above and in open communication with the vertical heating chamber.

In the operation of the distilling chamber, the contaminated fluid from the holding tanks is preheated as it passes through a serpented pipe 80 which extends through the vertical heating chamber of the distilling chamber. As the preheated contaminated fluid passes through the nozzles 26 into the upper portion of the distilling chamber the reduction in pressure causes a first portion of the water or solvent contained in the mixture to become vaporized. The remaining contaminated liquid impacts against the porous screen member 76 and is distributed across the width of the distilling chamber. As the liquid drips through the screen, it falls in contact with the tubular exchange pipes 50. As the fluid is moving at a slow velocity, it will tend to travel around the outer surface of the tubular heating members causing further vaporization of the water and solvents which are contaminating the residual product which has been flushed from a tank or container. After passing through the tubular heating exchanger, the fluid will be collected on the first flat plate heat exchanger and subsequently on to the second flat heat exchanger wherein further vaporization of the water and solvent is accomplished. The substantially pure residual product thereafter falls to the bottom plate of the distilling chamber where such fluid is subjected to additional heat as it is delayed for a short period of time by the weir member 75 so that any remaining solvents or water will be vaporized before the pure residual product is conducted to a storage container, (not shown), where it is retained for future use of resale. By regulating the temperatures of the oil within the distilling chamber, the vaporization of both high and low boiling point chemicals may readily be achieved. With reference to FIG. 4, the liquid level in the bottom of the distillation chamber may be visually checked by means of a window 81 which is provided in the door panel 48.

The vapor which is created during the distillation process passes through the vapor outlet 41 and is conducted to one or more condensers 45 where the vapor is converted to a liquid for subsequent storage in solvent tanks 13 or a water retention tank 15. In order to separate the low molecular weight or low boiling point chemicals from the higher molecular weight, higher boiling point chemicals, a fractionating separator or column may be disposed between the distillation chamber and the condenser so that the individual or separate solvents may be separately removed and condensed for future use.

I claim:

1. An apparatus for separating a mixture of liquids by vaporization comprising a housing having upper and lower and front and back wall portions, nozzle means disposed through said upper portion of said housing, first porous means mounted within said housing for receiving fluid from said nozzle means, a plurality of tubular heat exchange means mounted below said porous means for receiving liquid passing through said porous means, at least one hollow flat plate heat exchange means mounted below said plurality of tubular heat exchange means for receiving fluid passing from said tubular heat exchange means, a collection plate means mounted below said flat plate heat exchange means for receiving fluid passing therefrom, a weir means disposed across said collection plate means, an outlet means for receiving fluid passing over said weir means and from said collection plate means, and an opening disposed through said housing through which vapor generated within said housing may pass.

2. The apparatus of claim 1 in which each of said tubular heat exchange means has first and second ends, said first ends of said tubular heat exchange means being mounted to a fluid header and said second ends being mounted within a vertical heating chamber, said fluid header and said vertical heating chamber being in fluid communication on opposed sides of said housing through said tubular heat exchange means.

3. The apparatus of claim 2 including preheating heat exchange means disposed through said vertical heating chamber.

4. The apparatus of claim 2 in which each of said flat plate heat exchange means includes an upper and lower surface and first and second ends, said first ends of said flat plate heat exchange means being in open fluid communication with said vertical heating chamber, and outlet means adjacent said second end for draining fluid passing from said vertical heating chamber and between said upper and lower surfaces of said flat plate heat exchange means.

5. The apparatus of claim 4 in which each of said flat plate heat exchange means includes at least one baffle means extending between said upper and lower surfaces thereof, each of said baffle means having a plurality of openings therethrough through which fluid may pass from said vertical heating chamber to said outlet means.

6. The apparatus of claim 4 including first and second hollow flat plate heat exchange means mounted within said housing, said second end of said first flat plate heat exchange means being spaced from said front wall portion of said housing and being inclined downwardly along its length towards said front wall portion of said housing, said second flat plate heat exchange means being mounted below said first flat plate heat exchange means for receiving fluid passing from said second end of said first flat plate heat exchange means, said second flat plate heat exchange means being inclined downwardly from adjacent said front wall portion toward said back wall portion of said housing, and drain means through said second plate heat exchange means adjacent said first end thereof through which fluid may pass to said collection plate means.

7. The apparatus of claim 6 including heating chamber means disposed below said collection plate means and being in open fluid communication with said vertical heating chamber and outlet means connected to said heating chamber means for withdrawing fluid therefrom.

8. The apparatus of claim 1 including means disposed below said collection plate means for heating said collection plate means.

9. An apparatus for separating a mixture of liquid by vaporization comprising a housing having upper and lower and front and back wall portions, nozzle means disposed through said upper portion of said housing, first porous means mounted within said housing for receiving fluid from said nozzle means, a plurality of tubular heat exchange means mounted below said porous means for receiving liquid passing through said porous means, each of said tubular heat exchange means having first and second ends, said first ends of said tubular heat exchange means being mounted to a fluid header and said second ends being mounted within a vertical heating chamber, said fluid header and said vertical heating chamber being in fluid communication on opposed sides of said housing through said tubular heat exchange means, first and second hollow flat plate heat exchange means mounted below said plurality of tubular heat exchange means for receiving fluid passing therefrom, said first and second flat plate heat exchange means having upper and lower surfaces and first and second ends, said first ends of said first and second flat plate heat exchange means being in open fluid communication with said vertical heating chamber, said second end of said first flat plate heat exchange means being spaced from said front wall portion of said housing and being inclined downwardly from adjacent said front wall portion toward said back wall portion of said housing, drain means through said second flat plate heat exchange means adjacent said first end thereof through which fluid may pass, a collection plate means mounted below said second flat plate heat exchange means for receiving fluid passing therefrom, an outlet means for receiving fluid passing from said collection plate means, heating chamber means disposed below said collection plate means and being in open fluid communication with said vertical heating chamber, and an opening disposed through said housing through which vapor generated within said housing may pass.

10. The apparatus of claim 9 including weir means disposed across said collection plate means over which the fluid flows toward said outlet means.

11. A method for separating water and solvents from a mixture containing water and solvents comprising the steps of:
   (a) filtering the mixture through a mechanical filter;
   (b) preheating the filtered mixture;
   (c) introducing the mixture into a distillation zone;
   (d) interrupting the flow of the mixture to reduce its velocity to cause such mixture to drip as it flows by gravity through the distillation zone;
   (e) contacting said mixture with a tubular heat exchanger to vaporize a portion of the water and solvent from said mixture;
   (f) collecting the mixture passing by gravity from the tubular heat exchanger on a series of flat plate heat exchangers where such mixture is caused to flow as a thin film thereby further vaporizing the water and solvent from said mixture to form a resultant mixture;
   (g) collecting the resultant mixture passing from the flat plate heat exchanger on a heated collection plate where on such resultant mixture is pooled while being exposed to heat thereby vaporizing any remaining water and solvent from said resultant mixture to leave a pure residual product;
   (h) collecting the vapor from within the distilling zone and condensing the vapor therefrom to form water and solvent products and thereafter storing said solvent products; and
   (i) collecting the residual product from said collecting plate.

* * * * *